Dec. 29, 1931.                T. H. AINSWORTH                1,838,079
ADJUSTABLE EQUALIZER FULCRUM DEVICE
Filed Nov. 8, 1930
—FIG.1.—
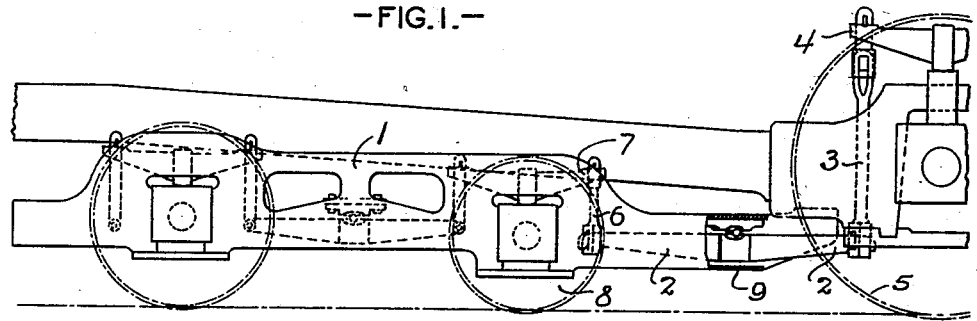
—FIG.3.—            —FIG.2.—
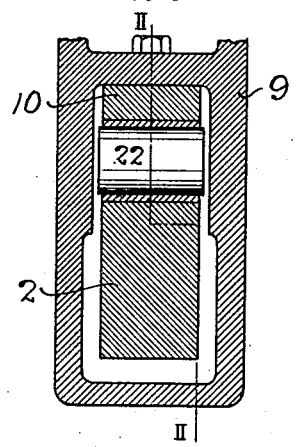 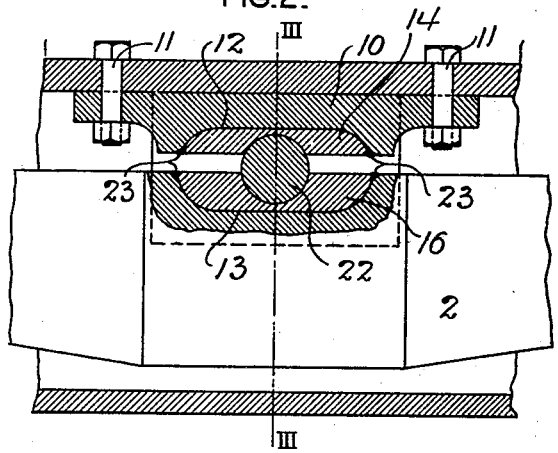
—FIG.4.—            —FIG.6.—
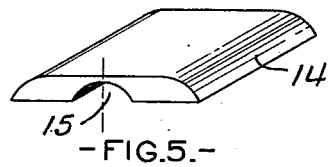 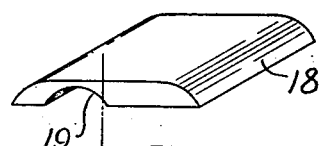
—FIG.5.—            —FIG.7.—
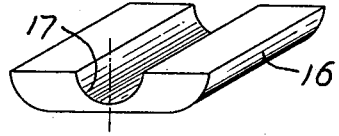 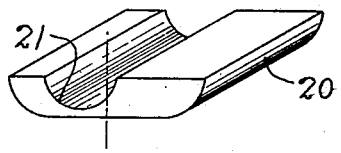
—FIG.8.—
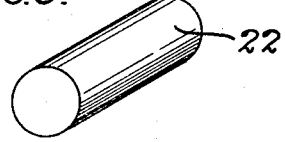
INVENTOR
Thomas H. Ainsworth
BY
ATTORNEY.

Patented Dec. 29, 1931

1,838,079

UNITED STATES PATENT OFFICE

THOMAS H. AINSWORTH, OF SCHENECTADY, NEW YORK

ADJUSTABLE EQUALIZER FULCRUM DEVICE

Application filed November 8, 1930. Serial No. 494,276.

This invention relates generally to the class of appliances known as spring rigging equalizers for locomotives, and particularly to equalizers adapted for use with the spring riggings of four wheel locomotive trucks.

In the spring suspension systems of locomotive trucks and driving wheels, it is desirable to provide an equalizer having means for readily adjusting the same, to change the proportions of the amounts of weight borne by the truck and driving wheels.

The object of the present invention is to provide a simple and inexpensive appliance which will be readily applicable to the equalizing levers in general use, and by which adjustment of the fulcrum of the lever may be effected within a relatively small space, in order to shift the load carrier, and increase or decrease, as desired, the respective amounts of weight proportionately borne by the spring suspension systems of the truck and the driving wheels. The object is attained by the provision of the novel equalizer fulcrum structure hereinafter fully described.

Referring to the accompanying drawings illustrating the preferred embodiment of the invention: Fig. 1 is a side view of the back end of a locomotive frame showing the invention applied thereto; Fig. 2 is an enlarged fragmentary longitudinal section of the truck frame including the equalizer and its fulcrum, taken on the line II—II of Fig. 3; Fig. 3 is a section on the line III—III of Fig. 2; Fig. 4 is an isometric view of an upper fulcrum bearing plate; Fig. 5 is a similar view of a lower bearing plate; Fig. 6 is an isometric view of an upper bearing plate with the groove-seat offset from the center of the same; Fig. 7 is a similar view of a lower bearing plate with the groove-seat correspondingly offset from the center of the same; and Fig. 8 is an isometric view of the fulcrum pin.

Where locomotive trailing trucks of the various standard two wheel types are used, the length of the equalizing levers between the spring suspension systems of the trucks and the rear locomotive driving wheels is sufficiently great to permit a plurality of longitudinally spaced holes to be formed therein. An equalizer fulcrum pin may then be passed through whichever hole affords the proper weight adjustment; and the proportionate weight borne by the truck and the rear driving wheels may be thus varied, as desired, by changing the location of the pin to the various holes. However, where four wheel trailing trucks, such as have recently been extensively adapted, are employed, the equalizing levers, under the necessary conditions of design, are of substantially shorter lengths, and consequently a much smaller change in the location of the fulcrum pin will effect the same transfer of weight. The necessary variation of the position of the fulcrum of these short equalizing levers is in fact so slight that a provision of a plurality of holes, such as were formed in the longer levers of the two wheel trucks, would be impractical, as the holes, here, would necessarily be so close to each other that they would overlap.

In devices of the prior art, where it has been attempted to effect a fulcrum adjustment without employing the hole arrangement, it has been necessary to provide relatively large openings in the equalizing levers which materially decrease their strength and durability. By the use of the device of the present invention, an adjustable fulcrum is provided without the employment of holes, and the undesirable openings in the equalizers are avoided.

Referring in detail to the descriptive embodiment of the invention as applied in connection with a four wheel trailing truck, indicated as an entirety, by the numeral 1, the forward end of the equalizing lever 2, is connected, as in usual practice, by an intermediate linkage, to the adjacent hanger 3, of the spring 4, of one of the wheels 5 of the rear pair of locomotive driving wheels. The rear end of the equalizer 2, is connected to the forward hanger 6, of the spring 7, of one of the forward trailing truck wheels 8. The equalizer 2, passes through the hollow side frame member 9 of the truck 1. A fulcrum seat 10, is secured to the upper wall of the frame member by the bolts 11, and a recess 12, is formed in the lower side of said seat. A corresponding recess 13, is formed in the upper side of the equalizer 2. An upper bearing plate 14, is so shaped as to fit into the recess 12, and is provided with a lateral groove 15, centrally located therein (Fig. 4). A lower bearing plate 16 (Fig. 5), is likewise shaped to fit into the recess 13, of the equalizer, and is provided with a groove 17, similarly formed and located, to the groove 15. Bearing plates 18 and 20, are formed identically to the bearing plates 14 and 16 respectively, except that their corresponding lateral grooves 19 and 21, are offset from the center lines of the same.

When the plates are inserted in their operative adjusted positions, the upper plates, 14 or 18, in the groove 12, and the corresponding respective lower plates, 16 or 20, in the groove 13, their respective lateral grooves are positioned opposite to each other so as to form a bearing seat for the cylindrical fulcrum pin 22 (Fig. 8), through which weight of the locomotive is transmitted to the equalizing lever. The upper and lower bearing plates are secured in their respective recesses by being welded at their ends to the block 10, and the lever 2, as indicated at 23, and the fulcrum pin 22 is held in its position against end-wise movement by the sides of the hollow frame member 9.

It will be apparent that by the use of the two pairs of bearing plates, three different fulcrum adjustments will be possible within a relatively small space. The upper and lower corresponding bearings 14 and 16, will of course afford a centrally located fulcrum position relative thereto. By removing these plates, however, and inserting the bearing plates 18 and 20 in their respective places, a fulcrum position offset from the center in one direction, will be effected; and by reversing the positions of the latter pair of bearing plates, that is to say turning the same about end for end in their respective recesses, a fulcrum position offset to the other side of the center line will be effected.

While this invention has hereinbefore been described as embodied in a locomotive spring rigging, it will of course be understood that the same may be employed in any apparatus where an adjustable pivot member will prove desirable. Likewise, in the practice of this invention many changes and modifications in the details of construction may prove desirable, and will be apparent to those skilled in the art. For instance, the fulcrum seat block 10, may be made integral with the truck frame 9, or it may be bolted, as shown, and the bearing plate made integral with the block 10, whereupon the block may be reversed with the lower bearing plate 20 in the same manner as hereinbefore described for the adjustment of the two plates 18 and 20; or the integrally formed block and bearing may be moved longitudinally to position the upper pin groove opposite its mating groove beneath, additional bolt holes for the bolt 11, being provided to permit this adjustment. It is to be understood, however, that all and any such changes or modifications are contemplated as within the spirit of this invention and the scope of the appended claims.

The invention claimed and desired to be secured by Letters Patent is:

1. In a spring rigging, an equalizing lever between the springs of said rigging; a fulcrum pin for said lever; and a pair of oppositely disposed bearing plates, each having a groove formed in its face offset from the center of said plate a distance of less than one-half of the width of the groove, said grooves being operably engaged with said pin.

2. In a railway vehicle the combination of an equalizing lever for transmitting weight; a supporting frame member; a fulcrum pin for said lever; and end-for-end reversible, oppositely disposed, bearing plates connected with said lever and said frame member, each plate having a groove formed in its face, said grooves being opposite to and in line with each other and offset from the centers of said plates a distance less than one-half the width of said grooves, said fulcrum pin being operably engaged by said grooves to provide an adjustable fulcrum.

3. In a locomotive, the combination of a truck frame; a driving wheel system; an equalizing lever for transmitting weight between the truck frame and the driving wheel system; a fulcrum pin for said lever; and end-for-end reversible bearing plates connected with said lever and said truck frame oppositely disposed with relation to each other and each having a lateral groove formed in its face, offset from the center of said plate a distance of less than one-half of the width of said groove, said fulcrum pin being operably disposed within said grooves to provide an adjustable fulcrum for said lever.

4. In a railway vehicle, the combination of an equalizing lever for transmitting weight; a supporting frame member having an upper wall and a pair of spaced side walls, said lever having its central portion disposed between the side walls; and a longitudinally adjustable fulcrum pin for said lever, said pin being disposed between the side walls, and the sides of said frame member operating to hold the pin in abutting relation against endwise movement.

5. In a locomotive, the combination of a truck frame having a side member comprising an upper wall and a pair of side walls spaced apart; a driving wheel system; an equalizing lever for transmitting weight between said frame and driving wheel system, said lever having its central portion disposed in the space between said side walls and being provided with a recess formed in its upper face; a fulcrum seat depending from said upper wall and having a recess in its lower face, opposite said first mentioned recess; end-for-end reversible bearing plates disposed in said recesses, having lateral grooves formed in their opposing faces; and a pin member operably disposed within said lateral grooves to provide an adjustable fulcrum for said lever.

6. In a locomotive, the combination of a truck frame; a driving wheel system, said frame having a side member comprising an upper wall and a pair of side walls spaced apart; an equalizing lever for transmitting weight between said frame and driving wheel system, having its central portion disposed in the space between the side walls; a fulcrum seat depending from the said upper wall and having a recess formed in its lower face, the said central portion of the lever having a recess formed in its upper face opposite said first mentioned recess; end-for-end reversible bearing plates disposed in said recesses each having a lateral groove formed in its opposing face, said grooves being offset from the centers of said bearing plates a distance of less than one-half the width of said grooves, and said grooves being in line with each other; and a pin member operably disposed between said plates, within said lateral grooves, and adapted to provide an adjustable fulcrum for the said lever.

THOMAS H. AINSWORTH.